United States Patent [19]
Eleftheriadis et al.

[11] Patent Number: 5,852,669
[45] Date of Patent: Dec. 22, 1998

[54] AUTOMATIC FACE AND FACIAL FEATURE LOCATION DETECTION FOR LOW BIT RATE MODEL-ASSISTED H.261 COMPATIBLE CODING OF VIDEO

[75] Inventors: Alexandros Eleftheriadis; Arnaud Eric Jacquin, both of New York, N.Y.

[73] Assignee: Lucent Technologies Inc., Murray Hill, N.J.

[21] Appl. No.: 500,672

[22] Filed: Jul. 10, 1995

Related U.S. Application Data

[60] Continuation-in-part of Ser. No. 455,472, May 31, 1995, Pat. No. 5,500,673, which is a division of Ser. No. 223,903, Apr. 6, 1994, Pat. No. 5,512,939.

[51] Int. Cl.$^6$ .............................. H04N 7/15; H04B 1/66
[52] U.S. Cl. ..................... 382/118; 382/173; 382/236; 382/250; 382/251; 382/291; 348/13; 348/397; 348/405; 348/419
[58] Field of Search .................... 382/232, 239, 382/251, 118, 173, 236, 250, 291; 348/169, 172, 405, 419, 13, 14, 15, 16, 17, 18, 19, 26, 27, 390, 397, 404; 358/430; 395/200.34

[56] References Cited

U.S. PATENT DOCUMENTS

| | | | |
|---|---|---|---|
| 4,691,233 | 9/1987 | Acampora | 358/136 |
| 4,700,226 | 10/1987 | Acampora | 358/136 |
| 4,745,492 | 5/1988 | Kobayashi et al. | 358/310 |
| 5,113,255 | 5/1992 | Nagata et al. | 358/136 |
| 5,327,228 | 7/1994 | Satyaarayana et al. | 348/647 |
| 5,367,629 | 11/1994 | Chu et al. | 395/162 |
| 5,381,183 | 1/1995 | Ishizuka et al. | 348/458 |
| 5,384,601 | 1/1995 | Yamashita et al. | 348/577 |
| 5,500,673 | 3/1996 | Zhou | 382/118 |
| 5,566,208 | 10/1996 | Balakrishnan et al. | 375/240 |

FOREIGN PATENT DOCUMENTS 0330455  2/1989  Japan.

OTHER PUBLICATIONS

"Line Transmission on Non–Telephone Signals—Video Codec For Audiovisual Services at px64 kbit/s—Recommendation H.261", CCITT, Geneva, 1990.

"Description of Reference Model 8 (RM8)", CCITT SGXV WG4, Specialists Group on Coding for Visual Telephony, Doc. 525, Jun. 9, 1989.

"Draft Revision of Recommendation H.261: Video Codec for Audiovisual Services at px64 kbit/s", Signal Processing: Image Communication, vol. 2, No. 2, Aug. 1990, pp. 221–239.

F. Lavagetto et al., "Object–Oriented Scene Modeling for Interpersonal Video Communication at Very Low Bit Rate," Signal Processing: Image Communication, vol. 6, 1994, pp. 379–395.

M. Liou, "Overview of the px64 kbit/s Video Coding Standard", Communications of the Acm, vol. 34, No. 4, Apr. 1991, pp. 60–63.

M. Soryani et al., Segmented Coding of Digital Image Sequences, Apr. 1992, pp. 212–218.

Adnan M. Alattar et al., Knowledge—Based System for Coding Head and Shoulder Images, May 1990, pp. 1026–1029.

Trew et al., Automatic Face Location to Enhance Videophone Picture Quality, pp. 489–497.

*Primary Examiner*—David K. Moore
*Assistant Examiner*—Brian P. Werner

[57] ABSTRACT

An apparatus responds to a video signal representing a succession of frames, where at least one of the frames corresponds to an image of an object, to detect at least a region of the object. The apparatus includes a processor for processing the video signal to detect at least the region of the object characterized by at least a portion of a closed curve and to generate a plurality of parameters associated with the closed curve for use in coding the video signal.

21 Claims, 5 Drawing Sheets

FIG. 6

AUTOMATIC FACE AND FACIAL FEATURE LOCATION DETECTION FOR LOW BIT RATE MODEL-ASSISTED H.261 COMPATIBLE CODING OF VIDEO

This is a Continuation-in-Part of U.S. patent application Ser. No. 08/455,472, filed May 31, 1995, now U.S. Pat. No. 5,500,673, which is a Divisional application of U.S. patent application Ser. No. 08/223,903, filed Apr. 6, 1994 now U.S. Pat. No. 5,512,939.

BACKGROUND OF THE INVENTION

1. Field of the Invention

This disclosure relates generally to the field of signal coding, and more particularly to the detection of facial features for use in the coding of video.

2. Description of the Related Art

With the increase in computational power in personal computers (PCs), including laptops, etc., multimedia applications integrating text, sound, and video capabilities have become more available to such PCs. Video generally requires relatively high bit rates, such as in the Motion Picture Experts Groups (MPEG) standards, to provide high quality images, but it may be acceptable to use relatively low bit rate video for teleconferencing situations. In such low bit rate video teleconferencing, the video coding may produce artifacts which are systematically present throughout coded images; for example, due to the coding of both facial and non-facial image portions at the same bit rate. As viewers tend to focus on facial features such as by maintaining eye contact with the "eyes" of the people in the image, a common coding bit rate for both facial and non-facial image portions fails to provide sufficient coding quality of the facial portions, thus hampering the viewing of the video image. In some situations, a very good rendition of facial features is paramount to intelligibility, such as in the case of hearing-impaired viewers who may rely on lip reading.

SUMMARY

An apparatus is disclosed which responds to a video signal representing a succession of frames, where at least one of the frames corresponds to an image of an object. The apparatus includes a processor for processing the video signal to detect at least the region of the object characterized by at least a portion of a closed curve and to generate a plurality of parameters associated with the closed curve for use in coding the video signal.

BRIEF DESCRIPTION OF THE DRAWINGS

The features of the disclosed facial feature detection system and method will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
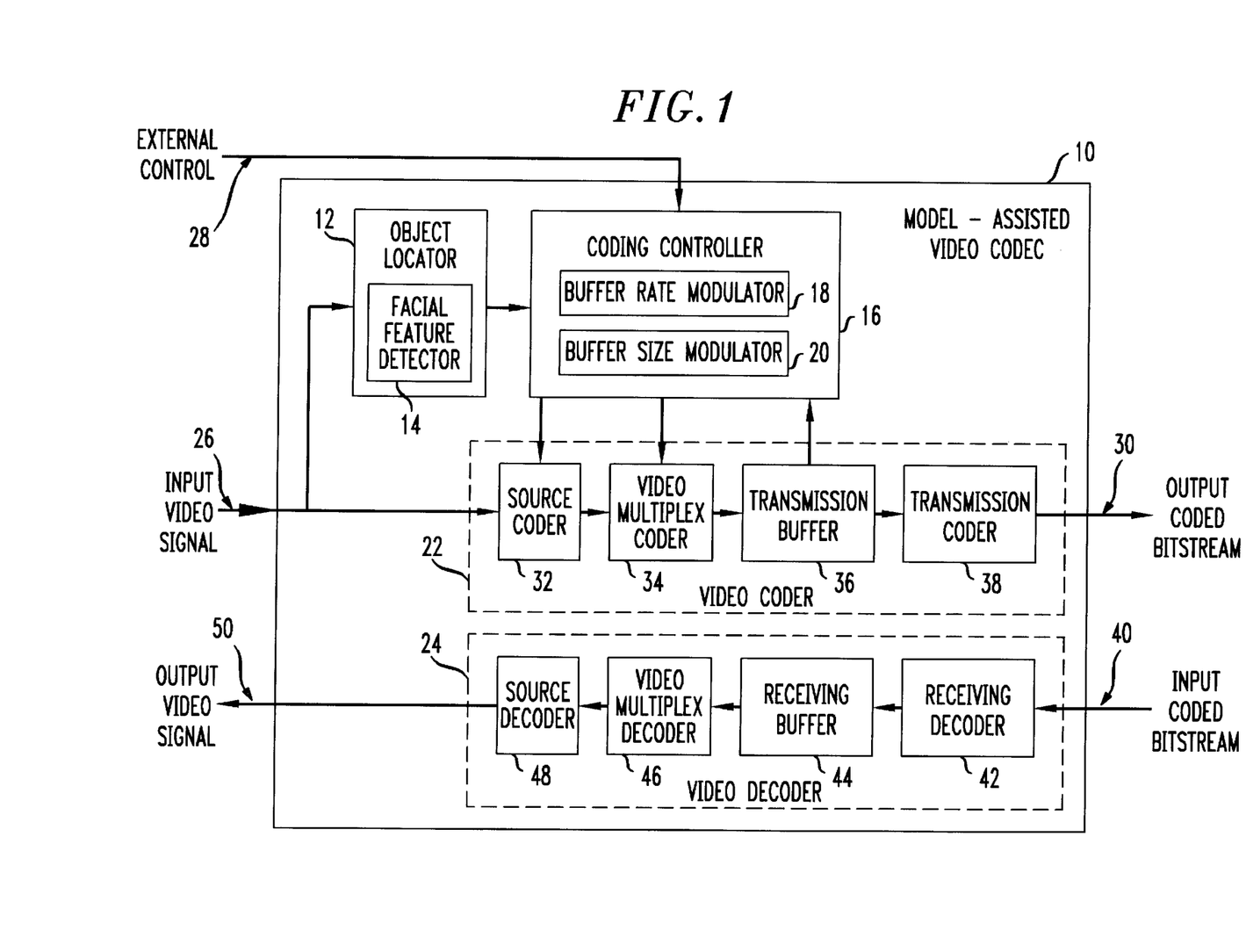
FIG. 1 illustrates a block diagram of a codec.

Referring now in specific detail to the drawings, with like reference numerals identifying similar or identical elements, as shown in FIG. 1, the present disclosure describes a facial feature detection system and method for detecting and locating facial features in video. The disclosed facial feature detection system and method is implemented, in an exemplary embodiment, in a low bit rate video codec 10, shown in FIG. 1, based on Motion-Compensated Discrete Cosine Transform (MC DCT) techniques, such as video coding methods complying with CCITT Recommendation H.261 for video coding at rates of p×64 kilobits per second (kbps), where p=1, 2, . . . , 30.

In the exemplary embodiment shown in FIG. 1, the codec 10 may include an object locator 12 having a processor, such as a microprocessor, and memory (not shown) for operating an object detection program implementing the disclosed facial feature detection system 14 and method. In an exemplary embodiment, the object detection program may be compiled source code written in the C programming language. The codec 10 also includes a coding controller 16 having a processor, such as a microprocessor, and a memory (not shown) for operating a coding control program implementing a disclosed buffer rate modulator 18 and a disclosed buffer size modulator 20. In an exemplary embodiment, the coding control program may be compiled source code written in the C++ programming language. It is to be understood that the object locator 12 including the disclosed facial feature detection system 14 and method as well as the disclosed coding controller 16 having the disclosed buffer rate modulator 18 and buffer size modulator 20 may be implemented in software using other programming languages and/or by hardware or firmware to perform the operations described hereinbelow.

For clarity of explanation, the illustrative embodiment of the disclosed facial feature detection system 14 and method as well as the disclosed coding controller 16 having the disclosed buffer rate modulator 18 and buffer size modulator 20 is presented as having individual functional blocks, which may include functional blocks labelled as "processors". The functions represented by these blocks may be provided through the use of either shared or dedicated hardware, including, but not limited to, hardware capable of executing software. For example, the functions of the blocks presented herein may be provided by a single shared processor or by a plurality of individual processors. Moreover, the use of the functional blocks with accompanying labels herein is not to be construed to refer exclusively to hardware capable of executing software. Illustrative embodiments may include digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the labels for the functional blocks as used herein.

The codec 10 further includes a video coder 22 and video decoder 24, with each of the video coder 22 and video decoder 24 controlled by the coding controller 16. For coding operations, the codec 10 receives an input video signal 26 and an external control signal 28, and the object locator 12 and video coder 22 process the input video signal 26, under the control of the coding controller 16 using the external control signal 28, to generate the output coded bitstream 30. In an exemplary embodiment, the video coder 22 may process the input video signal 26 using a source coder 32, a video multiplex coder 34, a transmission buffer 36, and a transmission coder 38 to generate the output coded bitstream 30.

For decoding operations, the video codec 10 receives an input coded bitstream 40 by the video decoder 24, which processes the input coded bitstream 40 using a receiving decoder 42, a receiving buffer 44, a video multiplex decoder 46, and a source decoder 48 for generating the output video signal 50.

An example of a video encoder using model-assisted coding is described in greater detail in commonly assigned, U.S. patent application Ser. No. 08/250,251, filed May 27, 1994 and entitled "MODEL-ASSISTED CODING OF VIDEO SEQUENCES AT LOW BIT RATES", the entire application and appendix thereto being incorporated herein by reference.

Figure 2:
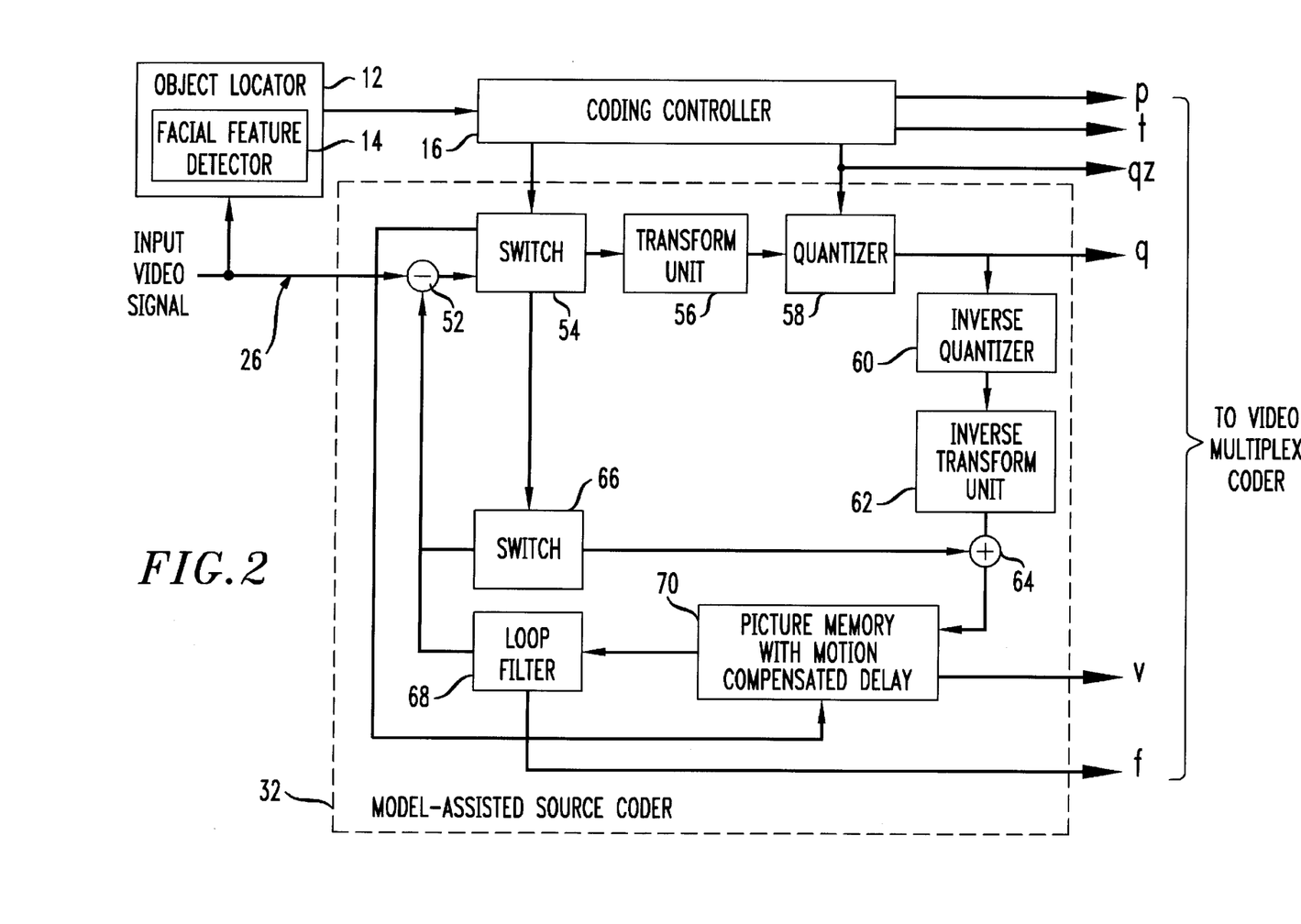
FIG. 2 illustrates a block diagram of a source coder.

An exemplary implementation of the model-assisted source coder 32 of the video coder 22 in FIG. 1 is shown in greater detail in FIG. 2, where the source coder 32 includes components 52–70 for generating output signals such as a quantized transform coefficient signal, labelled "q"; a motion vector signal, labelled "v"; and a switching signal, labelled "f", for indicating the switching on/off of the loop filter 68. The coding controller 16 uses object location signals from the object locator 12 to generate control signals such as an INTRA/INTER flag signal, labelled "p"; a flag labelled "t" to indicate a transmission state; and a quantizer indicator signal, labelled "qz". Such control signals are provided to the video multiplex coder 34 for further processing.

The codec 10 shown in an exemplary embodiment in FIG. 1, as well as the video coder 22 having, in an exemplary embodiment, the model-assisted source coder 32 shown in FIG. 2, operate in accordance with the CCITT Rec. H.261 standard, such as described in "Line Transmission on Non-Telephone Signals—Video Codec For Audiovisual Services at p×64 kbit/s—Recommendation H.261", CCITT, Geneva, 1990. The disclosed facial feature detection system 14 and method may then be implemented as described in greater detail below, where the object location signals from the object locator 12 provided to the coding controller 16 includes facial feature detection signals from the facial feature detector 14.

The facial feature detection system 14 and method automatically extracts facial area location information for the region-selective coding of video teleconferencing sequences. Low-complexity methods are then performed to detect a head outline, and to identify an "eyes-nose-mouth" region from downsampled binary thresholded edge images. There are no restrictions regarding the nature and content of the head-and-shoulders sequences to code. The head outline detection and the "eyes-nose-mouth" detection may operate accurately and robustly in cases of significant head rotation and/or partial occlusion by moving objects, and in cases where the person in the image has facial hair and/or wears eyeglasses.

The disclosed invention also includes object-selective control of a quantizer in a standard coding system such as quantizer 58 in the H.261 compatible source coder 32 shown in FIG. 2. In the exemplary embodiment, the codec 10 is a Reference Model 8 (RM8) implementation of the H.261 compliant encoder, such as described in "Description of Reference Model 8 (RM8)", CCITT SGXV WG4, Specialists Group on Coding for Visual Telephony, Doc. 525, June 1989, which is incorporated herein by reference. It is to be understood that the disclosed facial feature system 14 and method is not limited to H.261, and may be used with different coding techniques, such as CCITT Rec. H.263 and MPEG, and different facial feature detection devices, such as neural network-based facial feature classifiers.

The object locator 12 incorporating the disclosed facial feature detection system 14 and method operates to control the quantizer 58 by performing buffer rate modulation and buffer size modulation. By forcing a rate controller of the coding controller 16, associated with the quantizer 58, to transfer a relatively small fraction of the total available bit rate from the coding of the non-facial image area to the coding of the facial image area; for example, about 10–15% of the average bit rate, the disclosed facial feature system 14 and method produces images with better-rendered facial features. For example, block-like artifacts in the facial area are less pronounced and eye contact is preserved. The disclosed facial feature system 14 and method may provide perceptually significant improvement of video sequences coded at the rates of 64 kbps and 32 kbps, with 56 kbps and 24 kbps respectively reserved for the input (color) video signal.

The codec 10 may operate using a total audio-video integrated services digital network (ISDN) rate of 64 kbps, with an input digital color video signal in the YUV format, and with a coding rate of 56 kbps for the video signal, where the video signal represents "head-and-shoulders" sequences. In the disclosed facial feature detection system 14 and method, face location detection and detection of "eyes-nose-mouth" regions in images is performed.

In the exemplary embodiment, the facial feature detection system 14 determines contours of a face, including the side or oblique views of the head when tilted with respect to the image, as ellipses. The detection of "eyes-nose-mouth" regions uses the symmetry of such regions with respect to a slanted facial axis, which is inherent to a human face appearing in a two-dimensional (2D) projection for a rotated head.

Hereinbelow, in the exemplary embodiment, the input video signals 26 represent video data of head-and-shoulders sequences. It is to be understood that the disclosed facial feature detection system 14 and method may be used with other video encoder systems and techniques operating at other rates, and such object tracking techniques may be adapted for different applications where objects other than faces are of interest.

The term "face location" is defined herein to include images representing people having heads turned to their left or right, thereby appearing in a profile, as well as images of people with their back to the camera, such that "face location" encompasses the location of a head outline.

Figure 3:
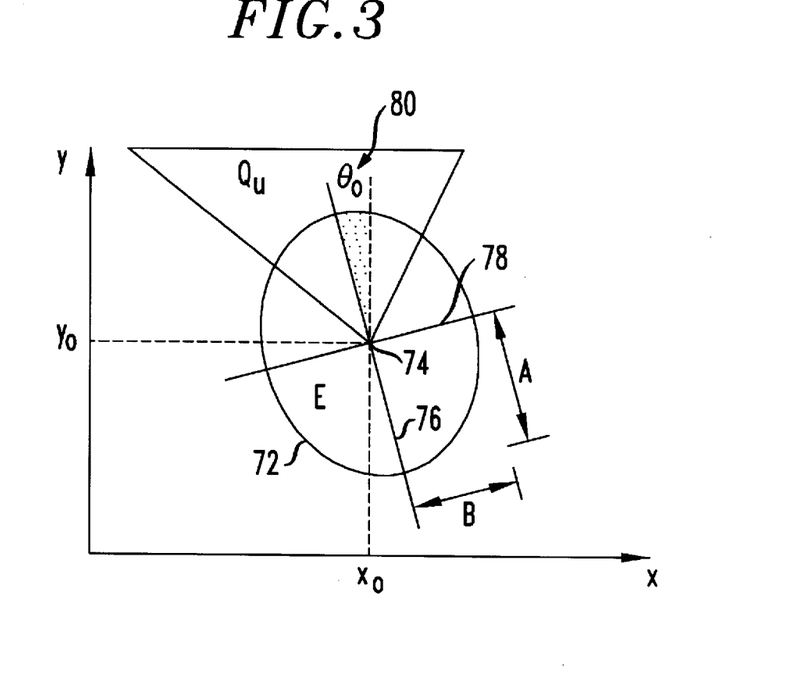
FIG. 3 illustrates an ellipse and associated parameters.

The face location is represented by an ellipse 72 labelled E as shown in FIG. 3, having a center 74 with coordinates $(x_0, y_0)$, with the semi-major length 76 labelled A and the semi-minor length 78 labelled B, along the ellipse's major and minor axes, respectively, and having an associated "tilt" angle 80 labelled $\theta_0$. The legend $Q_u$ designates a triangular region. Areas of the ellipse 72 at opposing ends along the major axis are where the upper and lower areas of a face are positioned. The upper and lower areas in actual face outlines, such as regions of a person's hair and chin, respectively, may have quite different curvatures, but ellipses provide relative accuracy and parametric simplicity as a model of a face outline. If the face outline information is not used to regenerate the face outline, a relative lack of model-fitting accuracy of the disclosed facial feature detection system and method may not have a significant impact in the overall performance of the coding process.

An ellipse of arbitrary size and tilt may be represented by a quadratic, non-parametric equation in implicit form in Equation (1) below:

$$ax^2+2bxy+cy^2+2dx+2ey+f=0, \ b^2-ac<0 \qquad (1)$$

where the negative value of the discriminant $D=b^2-ac$ has Equation (1) determining an ellipse. The parameters of Equation (1) are provided to the codec 10 as described in further detail below.

Figure 4:
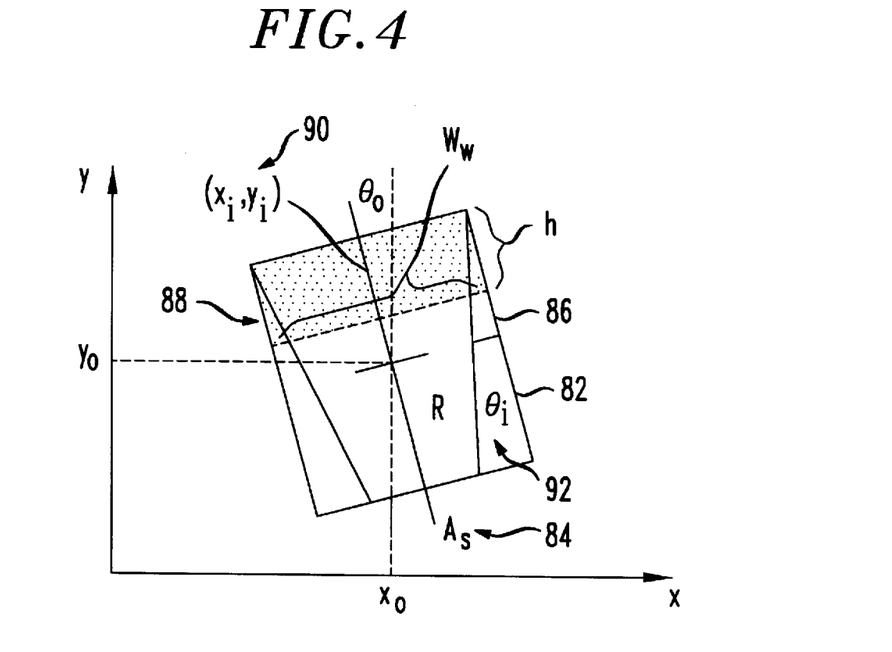
FIG. 4 illustrates a rectangular region and associated parameters.

In some situations, an elliptical head outline may provide a rough estimate of the face location, but the use of elliptical head outlines is adapted by the disclosed facial feature detection system 14 and method to identify a rectangular region 82 having a common center at coordinates $(x_0, y_0)$ with the ellipse 72, as shown in FIG. 4, and an axis of symmetry 84 of the face outline, labelled $A_s$, which may be parallel to the major axis of the ellipse 72. The rectangular region 82 includes the eyes, nose, and mouth of the person in the encoded image. Such a rectangular region 82 has an extra degree of freedom relative to using only an ellipse, for example, ellipse 72 of FIG. 3, to model a face outline using a trapezoidal region, labelled R in FIG. 4, by allowing a slant of its sides with respect to an image vertical 86 parallel to the axis of symmetry 84, as shown in FIG. 4, which ensures that the detection is robust in the case of slight head motion. In an exemplary embodiment, about an upper third of the rectangular region 82, defined herein to be a window 88 labelled $W_u$ in FIG. 4, may include the eyes and eyebrows, which are generally are the two most reliably symmetric features in a human face. The window 88 may be characterized by a window center 90 having coordinates $(x_i, y_i)$, window width $W_w$, height h, and angle 92 labelled $\theta_i$, where the angle 92 determining a trapezoidal shape generally indicates the relative positions of the eyes, nose, and mouth of a person's face.

Figure 5:
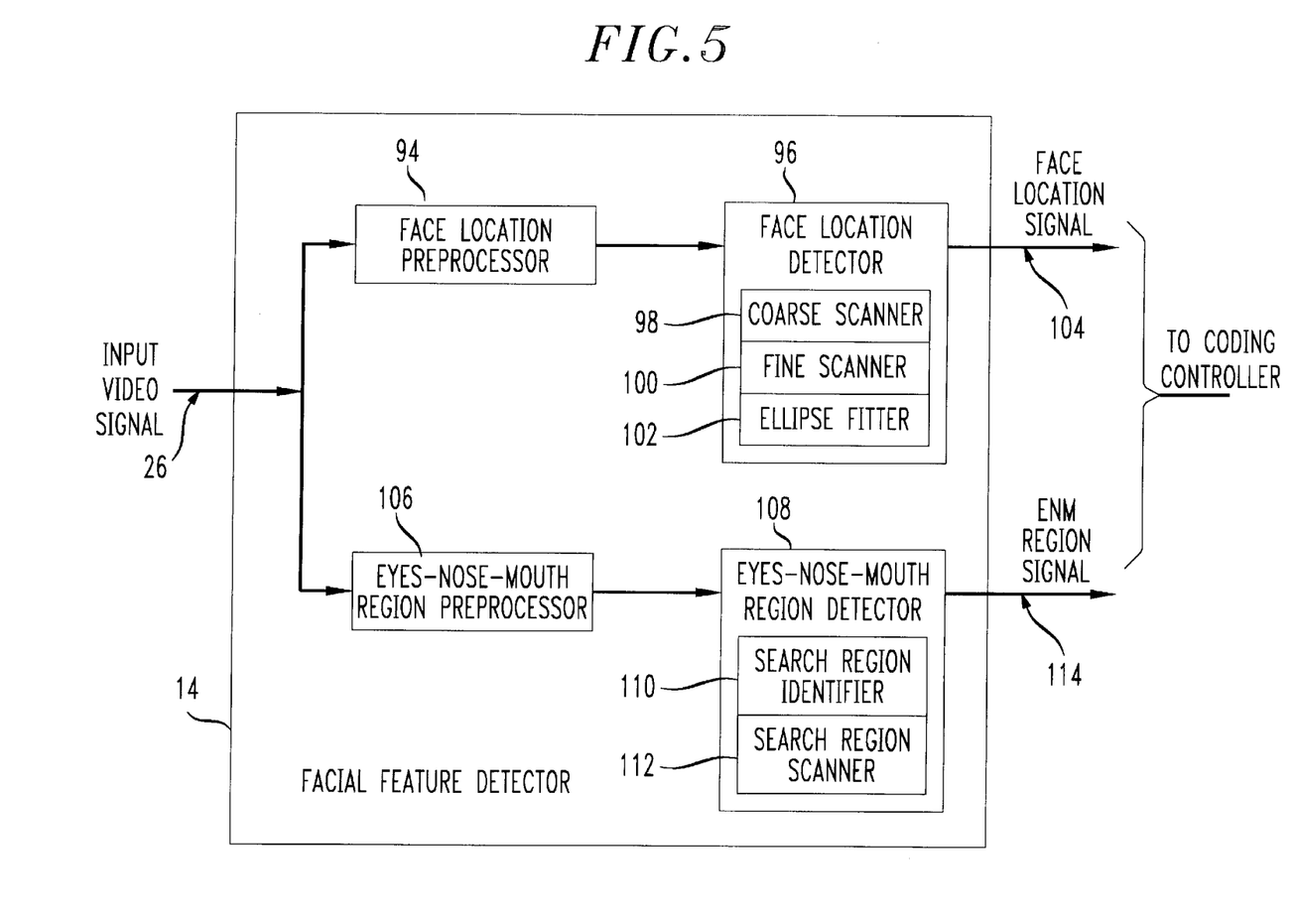
FIG. 5 illustrates a block diagram of the disclosed facial feature detector.

As illustrated in FIG. 5, the facial feature detection system 14 of FIGS. 1–2 includes at least one preprocessor circuit for pre-processing the input video signal for detection of facial features by a detector. As shown in FIG. 5, the facial feature detection system 14 may include a face location preprocessor 94 operatively connected to a face location detector 96, having a coarse scanner 98, a fine scanner 100, and an ellipse fitter 102 for generating a face location signal 104. The facial feature detection system 14 may further include an eyes-nose-mouth (ENM) region preprocessor 106 operatively connected to an eyes-nose-mouth region detector 108 having a search region identifier 110 and a search region scanner 112 for generating an ENM region signal 114. Each of the search region identifier 110 and the search region scanner 112 may be implemented as hardware and/or software as described above in conjunction with the facial feature detector 14.

Figure 6:
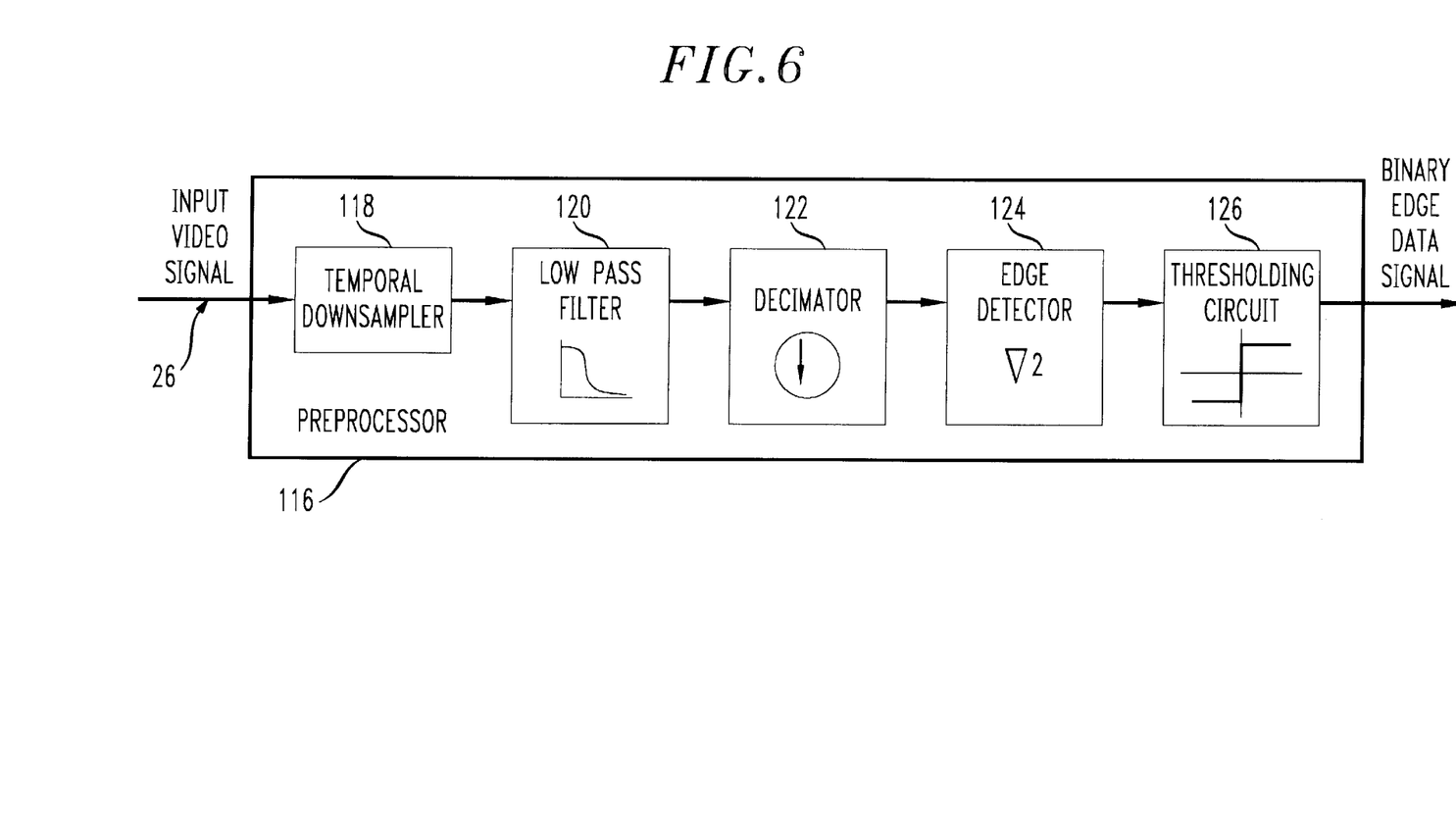
FIG. 6 illustrates a block diagram of a preprocessor.

Each preprocessor 94, 106 may be implemented as a preprocessing circuit 116, as illustrated in FIG. 6, which may employ a temporal downsampler 118, a low pass filter 120, a decimator 122, an edge detector 124, and a thresholding circuit 126. The temporal downsampler 118 may be included if the input video signal 26 has not been downsampled to, for example, a desired input frame rate of the source coder 32 of FIG. 2.

The temporal downsampler 118 performs temporal downsampling of the input luminance video signal from, for example, about 30 frames per second (fps) to, for example, about 7.5 fps to be the frame rate of the input video signal to the video codec 10. The low pass filter 120 is a separable filter for performing spatial low-pass filtering of input video frames of size 360×240 pixels with a cut-off frequency at $\pi/c$, where c is a decimation factor.

In the exemplary embodiment, each of the face location preprocessor 94 and the ENM region preprocessor 106 shown in FIG. 5 may be implemented to employ a common temporal downsampler and a common low pass filter. After low pass filtering, the filtered input video signal is then processed by the decimator 122 to perform decimation by a predetermined decimation factor c in both horizontal and vertical dimensions to produce low-pass images of a predetermined size. In the exemplary embodiment, the face location preprocessor 94 employs a decimator performing decimation by a factor of c=8 to generate an image of size 45×30 pixels. The ENM region preprocessor 106 employs a decimator performing decimation by a factor of c=2 to generate an image of size 180×120 pixels in order not to lose the features of interest in the downsampling; for example, the eye, nose, and mouth edge data.

Each preprocessor 94, 106 then performs edge detection on the decimated images by edge detector 124 employing Sobel operator techniques, where the Sobel operator may be represented in matrix form by horizontal and vertical operators; for example, $$\delta_x = \begin{bmatrix} -1 & 0 & 1 \\ -2 & 0 & 2 \\ -1 & 0 & 1 \end{bmatrix} \delta_y = \begin{bmatrix} 1 & 2 & 1 \\ 0 & 0 & 0 \\ -1 & -2 & -1 \end{bmatrix} \qquad (2)$$

which are used to determine the components of an image gradient. A gradient magnitude image is then obtained by generating the magnitude of the gradient at each pixel using the edge detector 124. Binary edge data signals are then generated using a threshold circuit 126 for performing thresholding of the gradient magnitude images.

Each of the face location detector 96 and the ENM region detector 108 shown in FIG. 5 uses the respective binary edge data signals from the respective preprocessors 94, 106 to detect the face location and the eyes-nose-mouth region, respectively, of the image represented by the input video signal 26. The face location detector 96 detects and traces the outline of a face location geometrically modeled as an ellipse, using the preprocessed and thresholded gradient magnitude images of size 45×30 pixels, to locate both oval shapes (i.e. "filled" shapes) as well as oval contours partially occluded by data.

The face location detector 96 operates a hierarchical three-step procedure: coarse scanning by a coarse scanner 98, fine scanning by a fine scanner 100, and ellipse fitting by an ellipse fitter 102, each of which may be implemented in hardware and/or software as described above for the facial feature detector 14. The face location detector 96 then selects a detected ellipse in an image as a most likely face outline among multiple candidates. The decomposition of the recognition and detection tasks in these three steps, along with the small input image size, provide for a low computational complexity of the disclosed facial detection system 14, and exhaustive searches of large pools of candidates may thus be avoided.

For coarse scanning, the coarse scanner 98 segments the input binary edge data signal into blocks of size B×B pixels; for example, of size 5×5 pixels. Each block is marked by the coarse scanner 98 if at least one of the pixels in the block has a non-zero value. The block array is then scanned in, for example, a left-to-right, top-to-bottom fashion, searching for contiguous runs of marked blocks. For each such run, fine scanning and ellipse fitting are performed.

The fine scanner 100 scans the pixels in the blocks of a run, for example, in a left-to-right, top-to-bottom fashion to detect the first line that has non-zero pixel values, as opposed to contiguous runs of pixels. The first and last non-zero pixels of the detected line, with coordinates $(X_{START}, Y)$ and $(X_{END}, Y)$, provide for a horizontal scanning region.

The coarse and fine scanning perform as a horizontal edge-merging filter. The size of the block relates to the maximum allowable distance between merged edges, and also has a direct effect on the speed of the face location detection to process large block sizes. The coarse and fine scanning identifies candidate positions for the top of the head, where the edge data corresponding to the head outline may be characterized as being generally unencumbered by data corresponding to other objects. After the fine scanning, the face location detector 96 may identify a horizontal segment which may include a top of a head in the image.

The ellipse fitter 102 scans the line segment determined by $(X_{START}, Y)$ and $(X_{END}, Y)$. At each point of the segment, ellipses of various sizes and aspect ratios are determined for fitness, where the top-most point of the ellipse may be located on the horizontal scanning segment. Good matches are entered as entries in a list obtained in a memory of the facial feature detection system 14 (not shown in FIG. 5). After the search is performed on the segment by the ellipse fitter 102, the face location detector continues processing input binary edge data signals using the coarse scanner 98.

In an exemplary embodiment, ellipses with "zero tilt" ($\theta=0$) may be fitted to the input images for computational simplicity. The fitness of any given ellipse to the data is determined by computing normalized weighted average intensities $I_i$ and $I_e$ of the binary pixel data on the ellipse contour and the ellipse border, respectively. Although an ellipse contour as well as the ellipse border may be well-defined by its non-parametric form, rasterization (spatial sampling) of image data may require the mapping of a continuous elliptical curve to actual image pixels.

Elliptical curves for ellipse fitting performed by the disclosed facial feature detection system 14 may be discrete curves determined as described below. Let $I_E(i,j)$ be an index function for the set of points that are inside or on the ellipse E, so $$I_E(i,j) = \begin{cases} 1 & \text{if } (i,j) \text{ is inside or on } E \\ 0 & \text{otherwise} \end{cases} \quad (3)$$

A given pixel may be classified as being on the ellipse contour if the pixel is inside (or on) the ellipse, and at least one of the pixels in a neighborhood of size $(2L+1) \times (2L+1)$ pixels about the given pixel is not, i.e.:

$$(i,j) \in c_i \iff I_E(i,j) = 1 \quad (4)$$

and $$\sum_{k=i-L}^{i+L} \sum_{l=j-L}^{j+L} I_E(k,l) < (2L+1)^2 \quad (5)$$

A given pixel is classified as being on the ellipse border if the given pixel is outside the ellipse, and at least one of the pixels in a neighborhood of size $(2L+1) \times (2L+1)$ pixels about the given pixel is inside the ellipse, i.e.

$$(i,j) \in C_e \iff I_E(i,j) = 0 \quad (6)$$

and $$\sum_{k=i-L}^{i+L} \sum_{l=j-L}^{j+L} I_E(k,l) > 0 \quad (7)$$

The parameter L determines a desired thickness of the ellipse contour and border; for example, L may be set at 1 or 2 pixels. For such contour and border pixels, the normalized weighted average intensities $I_e$ and $I_i$ may be defined as follows:

$$I_i = \frac{1}{|C_i|} \sum_{(m,n) \in C_i} w_{m,n} p(m,n) \quad (8)$$

and $$I_e = \frac{1}{|C_e|} \sum_{(m,n) \in C_i} w_{m,n} p(m,n) \quad (9)$$

where $p(m,n)$ represent the binary image data, $|C_i|$ and $|C_e|$ represent the cardinality of $C_i$, $C_e$, respectively, and $w_{m,n}$ are weighting factors for enhancing the contribution of the data in an upper quarter of the ellipse, as shown in FIG. 3, which may be a more reliable region for fitting the ellipse, i.e.

$$w_{(m,n)} = \begin{cases} w > 1 & \text{if } (i,j) \in Q_u \\ 1 & \text{if } (i,j) \notin Q_u \end{cases} \quad (10)$$

where $Q_u$ is the upper quarter of the ellipse shown in FIG. 3.

In the exemplary embodiment, a weight $w=1.5$ may be used. Normalization with respect to the "length" of the ellipse contour and border may also be performed to accommodate ellipses of different sizes. Generally, an ellipse may fit ellipse-shaped data when the value of $I_i$ is high, such as being close to a maximum value $I_{MAX}=(3+w)/4$, and when the value of $I_e$ is low, such as being close to zero in value. Such a joint maximization-minimization condition may be transformed to a maximization of a single quantity by defining a model-fitting ratio $R_m$ as:

$$R_m = \frac{1+I_i}{1+I_e} \quad (11)$$

where higher values of $R_m$ determine a better fitting of the candidate ellipse to the head outline in an input image. For example, perfectly ellipse-shaped data may have the best-fitting ellipse aligned with the data corresponding to $I_i=I_{MAX}$, $I_e=0$ and $R_m=1+I_{MAX}$.

The ellipse fitter 102 filters out false candidates by fitting ellipses satisfying the conditions $I_i > I_{imin}$ and $I_e < I_{emax}$, where $I_{imin}$ and $I_{emax}$ are predetermined parameters. The model-fitting ration $R_m$ may be more sensitive to the relative values of parameters $I_i$ and $I_e$ than to the absolute values of such parameters.

In some video images, only an arc of an ellipse may be distinguishable due to partial occlusion as well as motion in the area surrounding the face, including the shoulders. Using the above thresholds and the ratio $R_m$, the face location detector 96 may "lock on" to such arcs to locate severely occluded faces.

The face location detector 96 may detect more that one ellipse with a good fit, so an elimination process may be performed to select a final candidate using confidence thresholds $\Delta R_{min}$ and $\Delta I_{emin}$. If the value of $R_m$ for a good fitting ellipse is higher than the $R_m$ value for a second good fitting ellipse by more than $\Delta R_{min}$ then the first ellipse is selected. Otherwise, if the border intensity difference between the two ellipses is higher than $\Delta I_{emin}$, then the ellipse with the smaller value of $I_e$ is selected. If the border intensity difference is smaller than $\Delta I_{emin}$ then the ellipse with a greater value of $R_m$ is selected.

Having determined a face outline by a well-fitted ellipse, the face location detector 96 generates a face location signal from the parameters of the well-fitted ellipse, and provides the face location signal to the coding controller 16. The coding controller 16 uses the face location signal to increase the quantization of the area in the image corresponding to the face location.

In addition to locating a face outline using the face location detector 96, face location may also be performed using the ENM region detector 108 to segment the elliptical region as shown in FIG. 3 into a rectangular window and its complement, i.e. the remainder of the ellipse, as shown in FIG. 4. The ENM region detector 108 receives the ellipse parameters of the detected face outlines from the face location detector 96, and processes the ellipse parameters such that the rectangular window is positioned to capture the region of the face corresponding to eyes and mouth. The ENM region detector 108 identifies eyes/mouth regions uses the basic procedure described in F. Lavagetto et al., "Object-Oriented Scene Modeling for Interpersonal Video Communication at Very Low Bit Rate," SIGNAL PROCESSING: IMAGE COMMUNICATION, VOL. 6, 1994, pp. 379–395.

The ENM region detector 108 also includes detection of an eyes-nose-mouth region in an input video image where the subject does not directly face the camera, the subject has facial hair and/or wears eyeglasses, and the subject does not have a Caucasian skin pigmentation. The ENM region detector 108 exploits the typical symmetry of facial features with respect to a longitudinal axis going through the nose and across the mouth, where the axis of symmetry may be slanted with respect to the vertical axis of the image, to provide robustness in the detection of an eyes-nose-mouth region. Detection of the eyes-nose-mouth region may also be effected when the subject does not look directly at the camera which may occur in a video teleconferencing situation.

The ENM region detector 108 determines a search region using the search region identifier 110, where the center ($x_0$, $y_0$) of the elliptical face outline is used to obtain estimates for the positioning of the ENM window. The search region for the center of the ENM window may be a square region of size S×S pixels, where S=12 in the exemplary embodiments. As shown in FIG. 4, the ENM window is chosen to have a fixed size $W_w \times h$ relative to the minor and major axes of the face outline.

The ENM region detector 108 then processes the data associated with the search region using the search region scanner 112, in which, for each candidate position ($x_k$, $y_k$) of the window center in the search region, a symmetry value or functional is determined with respect to the facial axis. The facial axis may be rotated by discrete angle values about the center of the window. In an exemplary embodiment, slant values $\theta_k$ may be of any of the discrete values −10°, −5°, 0°, 5°, and 10°. For S(m,n) as the point which is symmetric to (m,n) with respect to an axis of symmetry $B_s((x_k, y_k),\theta_k)$, the symmetry value is determined as follows:

$$S(x_k, y_k, \theta) = \frac{1}{A(R)} \left( \sum_{(m,n) \in R \cap W_u} wa_{m,n} + \sum_{(m,n) \in R \setminus W_u} a_{m,n} \right) \quad (12)$$

where A(R) is the cardinality, i.e. the area in pixels, of the trapezoidal region R illustrated in FIG. 4, $R \setminus W_u$ is the set difference of R and $W_u$, $a_{m,n}$ is determined by:

$$a_{m,n} = \begin{cases} 1 & \text{if } p(m, n) = p(S(m, n)) = 1 \\ \frac{1}{2} & \text{if } p(m, n) = p(S(m, n)) = 0 \\ 0 & \text{otherwise} \end{cases} \quad (13)$$

and w is a weighting factor greater than one. The value of w is determined so that the data in $W_u$ significantly contributes to the symmetry value of Equation (12). The segmentation of the rectangular window into the regions $W_u$ and R provides that the data corresponding roughly to the eyes, nose and mouth are applied in the positioning of the window, and that this positioning depends on the "eye data" as a substantially symmetric region.

The ENM region detector 108 also eliminates false candidates defined as windows having a density of data points below a minimum density $D_{min}$. The ENM region detector 108 then generates an ENM region signal corresponding to the parameters of the resulting trapezoidal region R, with the ENM region signal used by the coding controller 16 to refine the quantization of the image data in the trapezoidal region R in the images corresponding to the eyes, nose, and mouth of a face in the image.

The face location signal and the ENM region signal from the facial feature detector 14 are provided to the coding controller 16 which implements the CCITT Rec. H.261 standard, Reference Model 8 (RM8). The Rec. H.261 standard prescribes the quantization of DCT coefficients using identical uniform quantizers with dead zones for all AC coefficients, and 8-bit uniform quantization for the DC coefficients with a step size of 8 pixels, so there is no perceptual frequency weighting. The AC coefficient quantizer step size is determined as twice the value of a parameter $Q_p$ or MQUANT, as the $Q_p$ parameter is referred to in the standard, which may be indicated up to the macroblock (MB) level. Throughout this disclosure, the term "MB" is an abbreviation for macroblock. A rectangular array of 11×3 MBs defines a group of blocks (GOB). The video images received and processed in the exemplary embodiment have a resolution of 360×240 pixels, resulting in a total of 10 GOBs per picture (frame).

Generally, using RM8, an increase of the length of the run-lengths in zig-zag scanned DCT coefficients is implemented by a "variable thresholding" technique which eliminates series of DCT coefficients with small enough values. Variable thresholding is applied prior to quantization and is generally effective in improving coding efficiency, particularly at relatively low bit rates. An MC/no-MC decision is based on the values of the macroblock and displaced macroblock differences, based on a predetermined curve. Similarly, the intra/non-intra decision is based on comparison of the variances of the original and motion-compensated macroblocks. Predicted macroblocks in P pictures are skipped if their motion vector is zero and all of their blocks have zero components after quantization. Macroblocks are also skipped in cases of output buffer overflow.

Rate control is performed starting with the first picture, as an I picture, which is coded with a constant $Q_p$ of 16 pixels. An output buffer is set at 50% occupancy. For the remaining pictures $Q_p$ is adapted at the start of each line of MBs within a GOB, so $Q_p$ may be adapted three times within each GOB. The buffer occupancy is examined after the transmission of each MB and, if overflow occurs, the next MB is skipped, which may result in a small temporary buffer overflow, and the MB that caused the overflow is transmitted. $Q_p$ is updated with the buffer occupancy according to the relation:

$$Q_{P_i} = \min\left\{ 31, \left\lfloor \frac{i}{B_{max}/32} \right\rfloor + 1 \right\} \quad (14)$$

where $Q_{pi}$ is the value of $Q_p$ selected for MB i, $B_i$ is the output buffer occupancy prior to coding MB i, and $B_{max}$ is the output buffer size. A buffer size of 6,400×q bits may used for a given bit rate of q×64 kbps for the video signal only. In an exemplary embodiment, a buffer size of 6400 bits may be employed.

Model-assisted coding operates to assign different "quality levels" at different regions of an image, such as regions bearing perceptual significance to a viewer. For low bit rate coding such as coding used in person-to-person communication applications, where the RM8 specification is used, macroblocks are coded in A regular left to right, top to bottom order within each GOB, and quantizer selection is based on a current buffer occupancy level. The location of a MB is used for such macroblock coding in order to allocate more bits to regions of interest while staying within a prescribed bit budget for each video image and/or avoiding buffer overflow. Accordingly, the coding may be controlled so as to allocate fewer bits on the remaining image regions. The coding operates for M regions of interest $R_1, R_2, \ldots, R_M$ in an image, with corresponding areas $A_1, A_2, \ldots A_M$, where the regions may be non-overlapping, i.e. $R_i \cap R_j$=the null set when $i \neq j$. The regions are not required to be convex. The rectangular region encompassing the whole image is denoted by $R_I$, and its area by A. In an exemplary embodiment, the coding of each macroblock may use $\beta$ bits on the average, when the target budget rate is $B_r$ and the buffer size is $B_{max}$.

The parameters $\beta_1, \beta_2, \ldots, \beta_M$ represent the target average number of bits per macroblock for the coding of each of the regions of interest. Generally, $\beta_i > \beta$ indicates an improved quality within the region of interest $R_i$. The region of the image that belongs to none of the regions of interest is indicated by $R_0$, with a corresponding area $A_0$ and average number of bits per macroblock $\beta_0$. To satisfy the given average bit budget, then:

$$\sum_{i=0}^{M} \beta_i A_i = \beta A \qquad (15)$$

For given parameters $\beta_1, \beta_2, \ldots, \beta_M$, $$\beta_0 = \frac{\beta A - \sum_{i=1}^{M} \beta_i A_i}{A - \sum_{i=1}^{M} A_i} \qquad (16)$$

which determines an equivalent average quality for the image region that is exterior to all objects and may be determined by a desired average coding quality of the regions and their sizes. Equation (16) may be expressed in terms of relative average qualities $\gamma_j = \beta_j / \beta$ for $j = 0, \ldots, M$, according to:

$$\gamma_0 = \frac{A - \sum_{i=1}^{M} \gamma_i A_i}{A - \sum_{i=1}^{M} A_i} \qquad (17)$$

where $\gamma_0 < 1$ if $\gamma_i > 1$ for all $i > 0$.

For a generic rate control operation of an encoder t operating according to:

$$Q_{p_i} = f(B_i) \qquad (18)$$

which generalizes Equation (14) above, the function f(.) may depend on the input video signal. The output buffer operation may be described by:

$$B_i = B_{i-1} + C(i-1) - t \qquad (19)$$

where $B_i$ is the buffer occupancy prior to coding MB i, t is the average target rate (in bits per MB), and c(i) is the number of bits spent to code the $i^{TH}$ MB and its immediately preceding overhead information; for example, headers. The function c(i) depends on the input video signal, as well as the current value of $Q_p$, which in turn depends on the selection of the function f(.).

Equations (18) and (19) are converted as described below to provide location-dependent, model-assisted operation, where the disclosed coding controller 16 includes a buffer rate modulator 18 to modulate the target rate so that more bits are spent for MBs that are inside regions of interest, and less for MBs that are not. The rate t in Equation (19) now becomes location-dependent, and is given by:

$$t_i = \gamma_{\zeta(i)} t \qquad (20)$$

where the region index function $\zeta(i)$ associates the position of MB i with the region in which MB i belongs, and a macroblock is considered to belong to a region if at least one of its pixels is inside that particular region. Accordingly, using the face location signal and the ENM region signal from the facial feature detector 14, the buffer rate modulator 18 generates parameter $\gamma$ to be greater than 1 in facial regions in the image associated with the region index function. The buffer rate modulator 18 then implements Equation (20) to increase the coding rate of regions in the image corresponding to detected face outlines and ENM features.

The buffer operation may now be described by:

$$B_i = B_{i-1} + C_{\zeta(i-1)}(i-1) - \gamma_{\zeta(i)} t \qquad (21)$$

where the number of bits spent $c_{\zeta(i)}$ is region-dependent. For stationary behavior of the buffer in region k, and performing an expectation operation on both sides of Equation (21), the average rate for region k is:

$$\overline{C}_k = \gamma_k t \qquad (22)$$

If the values of $\gamma_i$ satisfy the budget constraint given by Equation (15), then the total average rate is rate t. For a system operating with a regular, un-modulated output buffer emptied at the constant rate t, Equations (19) and (21) may be tracked to avoid buffer overflow or underflow. A modulated, "virtual" buffer which satisfies Equation (21) may be used to drive the generation of $Q_p$ via the function f(.) of Equation (18), while an actual buffer is monitored to force MB skipping in cases of overflow. When the virtual buffer overflows, no action may be taken, and $Q_p$ is typically assigned a maximum value, depending on f(.).

For MB scanning such as the scanning techniques employed by Rec. H.261, continuous runs of MBs of any one region may contain just 1 or 2 MB, resulting in an asymmetry in the overall bit distribution where left-most MBs of a region may have relatively high $Q_p$ values compared to their right-most counterparts.

The disclosed coding controller 16 implements a buffer size modulator 20 to perform buffer size modulation. Equation (18) is modified to be:

$$Q_{P_i} = g(B_i, i) = f\left(\frac{B_i}{\mu_{\zeta(i)}}\right) \qquad (23)$$

where $\mu_i$ are modulation factors for each region of the image. The buffer size modulator 20 implements Equation (23) to operate in regions of low interest, where $\gamma_i < 1$ and $\mu_i < 1$, to indicate that the buffer occupancy is higher that in actuality, and in regions of high interest such as face outlines and ENM regions where $\gamma_i > 1$ and $\mu_i > 1$ to indicate that the buffer occupancy is lower than in actuality. Accordingly, the $Q_{pi}$ values are "pushed" to higher or lower values, depending on the position of the MB within the image as coinciding with facial regions. In particular, when operating to encode a high coding quality region from a lower coding quality region, the buffer occupancy is low; for example, the buffer occupancy is less that $B_{max}/\gamma_0$ on the average for exterior regions. Generally, ample buffer space may then be available to absorb a rapid increase in the number of bits generated while coding blocks inside a high coding quality region. Furthermore, due to the MB scanning pattern, series of MB's of one region alternate with those another, and hence "relief" intervals are present in which the output buffer is allowed to drain.

Equation (23) may then be applied to Equation (14) to obtain:

$$Q_{P_i} = \min\left\{31, \left\lfloor \frac{\frac{B_i}{\mu_{\zeta(i)}}}{B_{max}/32} \right\rfloor + 1\right\} \quad (24)$$

RM8 updates $Q_p$ at the start of each line of MB's at each GOB, and the buffer size modulator 20 has $Q_p$ updated for each macroblock that is inside a region with $\gamma_i 1$. Accordingly, the disclosed buffer rate modulation may force the rate control operations to spend a specified number of additional bits in regions of interest, while buffer size modulation ensures that these bits are evenly distributed in the macroblocks of each region. It is to be understood that both the disclosed buffer rate modulation and buffer size modulation techniques may be applied in general to any rate control scheme, including ones that take into account activity indicators, etc.

While the disclosed facial feature system and method have been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. An apparatus for coding a video signal representing a succession of frames, at least one of the frames including an image of a human subject, the apparatus comprising:
   a processor for processing the video signal to detect at least a region of a head outline of the human subject characterized by at least a portion of an ellipse, and to generate a plurality of parameters associated with the ellipse for use in coding the video signal;
   wherein said processor is adapted to define a rectangular window encompassing an eyes-nose-mouth region of the subject as a function of the ellipse, and to determine an amount of slant of a symmetrical axis of the window with respect to a vertical axis of the image to enhance detection and image quality of the eyes-nose-mouth region of the subject.

2. The apparatus of claim 1 wherein the processor further includes:
   a preprocessor for preprocessing the video signal to generate an edge data signal corresponding to an edge of the head outline; and
   an object detector for processing the edge data signal to generate the plurality of parameters.

3. The apparatus of claim 1 further including:
   a coding controller, responsive to an object detection signal relating to the parameters, for performing buffer size modulation to adjust a quantizer step size used in the coding of the video signal to increase a buffer size for controlling the coding of the detected region of the object.

4. The apparatus of claim 1 further including:
   a coding controller, responsive to an object detection signal relating to the parameters, for performing buffer rate modulation to adjust a quantizer step size used in the coding of the video signal to increase a rate of coding for controlling the coding of the detected region of the object.

5. The apparatus of claim 1 wherein said processor further defines a trapezoidal region corresponding substantially to the eyes-nose-mouth region of the human subject, and further including a coding controller to refine quantization of image data in the trapezoidal region.

6. The apparatus of claim 1 wherein said window is defined as having a common center with said ellipse.

7. The apparatus of claim 1 wherein said processor includes means for detecting edge data of the eyes of the subject and said processor determines the amount of slant based upon said edge data.

8. The apparatus of claim 7 wherein the processor defines an upper rectangular region, within the rectangular window, corresponding to at least the eyes of the subject to facilitate determination of a symmetry value for the window and of said amount of slant.

9. The apparatus of claim 1 wherein the processor determines the amount of slant as one of a predetermined number of discrete slant angles.

10. A method for coding a video signal representing a succession of frames, at least one of the frames including an image of a human subject, the method comprising the steps of:
    detecting at least a region of a head outline of the human subject characterized by at least a portion of an ellipse;
    generating a plurality of parameters associated with the ellipse;
    coding the video signal using the plurality of parameters;
    defining a rectangular window encompassing an eyes-nose-mouth region of the subject as a function of the ellipse; and
    determining an amount of slant of a symmetrical axis of the window with respect to a vertical axis of the image to enhance detection and image quality of the eyes-nose-mouth region.

11. The method of claim 10 wherein the step of generating the plurality of parameters includes the step of:
    preprocessing the video signal to generate an edge data signal corresponding to an edge of the region of the human subject; and
    wherein the step of detecting includes the step of processing the edge data signal to detect at least the region of the human subject characterized by at least a portion of a closed curve.

12. The method of claim 10 further including the step of:
    adjusting a quantizer step size in response to a human subject detection signal; and
    coding the video signal using the adjusted quantizer step size.

13. The method of claim 12 further including the step of:
    increasing a buffer size for coding of the detected region of the human subject.

14. The method of claim 12 further including the step of:
    increasing a rate of coding of the detected region of the human subject.

15. The method of claim 10 further comprising the steps of:
    defining a trapezoidal region corresponding substantially to the eyes-nose-mouth region of the human subject; and
    refining quantization of image data in the trapezoidal region.

16. The method of claim 10 wherein said step of defining a rectangular window includes defining said window as having a common center with said ellipse.

17. The method of claim 10, further comprising the step of detecting edge data of the eyes of the subject, and wherein the amount of slant is determined based on the detected edge data.

18. The method of claim 17, further including the step of defining an upper rectangular region, within the rectangular window, corresponding to at least the eyes of the subject to facilitate determination of said amount of slant.

19. The method of claim 10 further including determining the amount of slant as one of a predetermined number of discrete slant angles.

20. A coding controller responsive to an object detection signal for controlling the coding of a video signal representing a succession of frames, at least one of the frames including an image of an object, the object detection signal indicating a detected region of the object, the coding controller comprising:

a processor for performing buffer size modulation and responsive to the object detection signal for adjusting a quantizer step size used in the coding of the video signal to increase a buffer size for coding of the detected region of the object, the coding being based on quantization of discrete cosine transform (DCT) coefficients, wherein said buffer size modulation is performed in accordance with the following equation:

$$Q_{P_i} = f\left(\frac{B_i}{\mu_{\zeta(i)}}\right)$$

where $Qp_i$ is an updated quantizer step size for a particular macroblock i, $B_i$ is an output buffer occupancy prior to coding macroblock i, f is a function of the input video signal, $\mu_i$ is a modulation factor for macroblock i, and $\zeta(i)$ is a region index function that associates a position of macroblock i with a region in which macroblock i belongs, wherein a macroblock is defined to belong to a region if at least one of its pixels is inside that region.

21. A coding controller responsive to an object detection signal for controlling the coding of a video signal representing a succession of frames, at least one of the frames including an image of an object, the object detection signal indicating a detected region of the object, the coding controller comprising:

a processor for performing buffer rate modulation and responsive to the object detection signal for adjusting a quantizer step size used in the coding of the video signal to increase a rate of coding of the detected region of the object, the coding being based on quantization of discrete cosine transform (DCT) coefficients, wherein the buffer rate modulation is based on the following equation:

$$B_i = B_{i-1} + C_{\zeta(i-1)}(i-1) - \gamma_{\zeta(i)} t,$$

where $B_i$ and $B_{i-1}$ are output buffer occupancies prior to coding macroblocks i and i−1, respectively, t is an average target rate in bits per macroblock, $\zeta(i)$ is a region index function associating a position of macroblock i with a region in which macroblock i belongs, where a macroblock is defined to belong to a region if at least one of its pixels is inside that region, the function $C_{\zeta(i-1)}(i-1)$ is the number of bits spent to code the $(i-1)^{st}$ macroblock in a particular region associated with $\zeta(i-1)$ and immediately preceding overhead information thereof, and γ is a parameter which is greater than one in object regions of the image associated with the region index function.

* * * * *